Jan. 28, 1947.  J. F. MELICHAR  2,414,966
VALVE ASSEMBLY
Filed Feb. 15, 1945  2 Sheets-Sheet 1
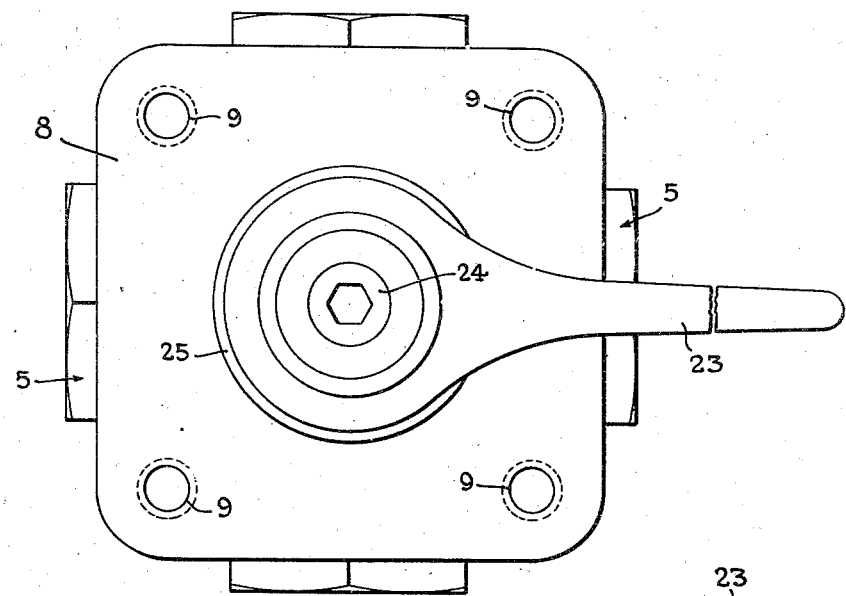
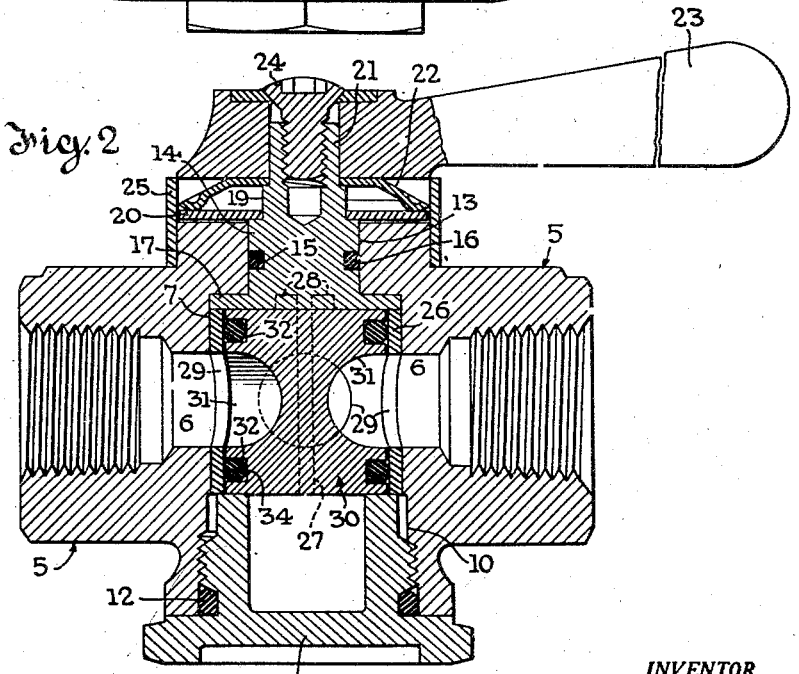
INVENTOR.
Joseph F. Melichar
BY
Mason, Porter & Diller
Attorneys Jan. 28, 1947.    J. F. MELICHAR    2,414,966
VALVE ASSEMBLY
Filed Feb. 15, 1945    2 Sheets-Sheet 2
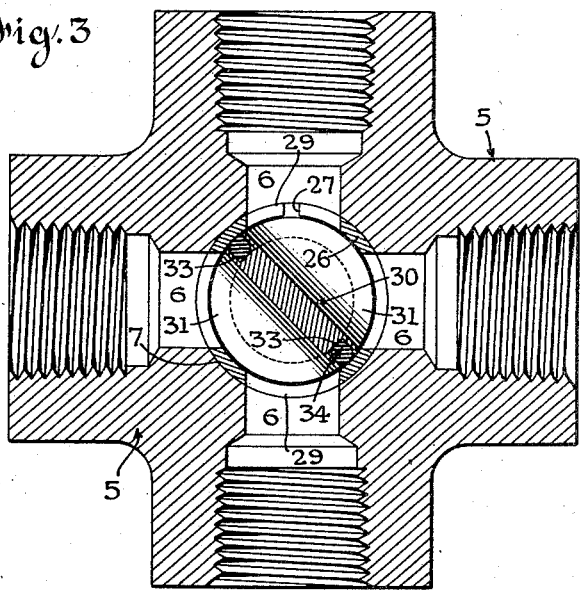
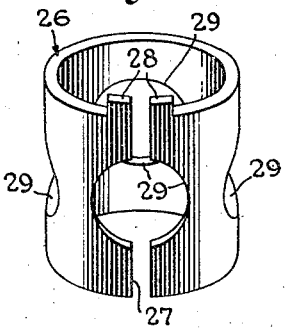
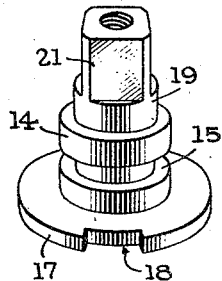
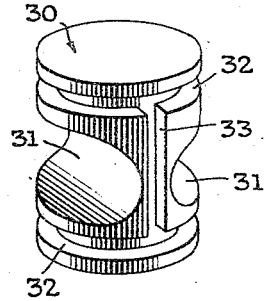
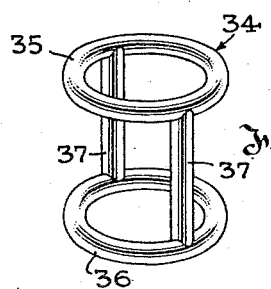
INVENTOR.
Joseph F. Melichar
BY
Mason, Porter & Diller
Attorneys Patented Jan. 28, 1947

2,414,966

UNITED STATES PATENT OFFICE 2,414,966

VALVE ASSEMBLY

Joseph F. Melichar, Cleveland, Ohio, assignor to The Parker Appliance Company, Cleveland, Ohio, a corporation of Ohio Application February 15, 1945, Serial No. 578,085

3 Claims. (Cl. 251—96)

The invention relates generally to valve assemblies and primarily seeks to provide an improved assembly in which the rotor is in the form of a split shell having flow passages therein and snugly and rotatably engaging the rotor bore in the casing for controlling flow therethrough, and in which there are included means within the shell for yieldably expanding the same against the rotor bore walls, and turning means so connected with the shell as to tend to contract the same slightly as it is turned in one direction or the other, thereby to reduce the effort required to turn the shell in the rotor bore.

An object of the invention is to provide a valve assembly of the character stated in which the means within and constantly tending to expand the shell comprises a plug spaced slightly within the shell and having flow passages therein placeable by rotation of the shell and plug for controlling flow through the valve, and yieldable gasket means interposed between the plug and the shell and effective to cause them to turn in unison.

Another object of the invention is to provide a valve assembly of the character stated which is of the four port reversing type and wherein the split shell has four openings placed for selective simultaneous registry with the casing ports, and in which the plug is provided with side recesses placeable so that each may selectively connect two ports and is frictionally connected to turn with the shell by a deformable gasket cage comprising upper and lower rings placed respectively above and below the side recesses and connected by two vertical legs disposed between said recesses.

With the above and other objects in view that will hereinafter appear, the nature of the invention will be more clearly understood by reference to the following detailed description, the appended claims, and the several views illustrated in the accompanying drawings.

In the drawings:

Figure 1 is a plan view illustrating a valve assembly embodying the invention.

Figure 2 is a vertical cross sectional view illustrating the valve assembly shown in Figure 1.

Figure 3 is a horizontal section taken through the plane in which the casing ports lie.

Figure 4 is a detail perspective view of the rotor shell.

Figure 5 is a detail perspective view of the shell turning stem and flange.

Figure 6 is a perspective view of the rotor plug.

Figure 7 is a detail perspective view of the deformable sealing gasket cage.

In the example of embodiment of the invention herein disclosed, there is included a casing 5 which is generally cruciform in horizontal cross section as illustrated in Figure 3. The casing is equipped with four ports 6 in equidistantly spaced relation and in a common plane about the centrally disposed rotor bore 7. The casing includes a mounting flange 8 which is apertured as at 9 to facilitate mounting of the valve assembly.

The rotor bore includes an enlarged internally threaded portion 10 at the lower end thereof in which is threadably mounted a closure plug 11, and the closure plug includes an annular groove in which to receive a sealing ring 12 which is effective to prevent leakage through the bottom of the valve casing.

The casing also includes a stem bore 13 arranged in axial alignment with the rotor bore 7 and which rotatably receives a stem 14 having an annular groove 15 therein in which to receive a sealing ring 16 which is effective to prevent leakage through the upper portion of the valve assembly. It will be apparent by reference to Figures 2 and 5 of the drawings that the stem 14 also carries a turning flange 17 which fits in the upper portion of the rotor bore 7 and is equipped with a driver notch 18 in its periphery.

The turning stem 14 extends upwardly through the stem bore 13, and this upwardly extended portion of the stem includes a circular end portion 19 which is turnable within a stationarily mounted detent plate 20, and a non-circular upper end portion 21 whereon is fitted a detent member 22 engageable with the plate 20 in a manner for yieldably retaining the valve rotor in one or the other of two selective positions to be referred to hereinafter. The indexing means including the plate 20 and the detent member 22 forms no part of the present invention, such indexing means being the subject of a copending application for U. S. Letters Patent, application No. 566,173 filed by Harry B. Carbon on December 1, 1944. A handle 23 is secured by a screw 24 on the non-circular stem extension 21, and by this means rotation may be imparted to the stem 14 and the turning flange 17 carried thereby. A ring or collar 25 may be provided for encasing the indexing means in the manner clearly illustrated in Figures 1 and 2 of the drawings.

A rotor shell 26 is mounted within the rotor bore 7 with its outer surface snugly and rotatably engaging the surrounding bore walls. The shell is split at 27 and is equipped with two upstanding driver lugs 28, one thereof projecting upwardly from the shell at each side of the split 27 therein in the manner clearly illustrated in Figures 2 and 4 of the drawings. It will be apparent by reference to Figures 2, 3 and 4 of the drawings that the shell is provided with four equidistantly spaced apertures or openings 29, one of which is located at the position of the split 27, and the openings are disposed for being selectively and simultaneously registrable with the casing ports 6 in the manner illustrated in Figures 2 and 3.

Slightly spaced within the shell 26 is a rotor plug 30 which is cylindrical in shape and provided with two side recesses or flow passages 31 which are selectively placeable in the manner illustrated in Figure 3 for connecting selected pairs of the casing ports 6. It will be apparent by reference to Figures 2 and 6 of the drawings that the plug is provided with upper and lower annular grooves 32 arranged above and below the side recesses 31, and two side grooves 33 connecting the upper and lower grooves 32 and disposed between the ends of the side recesses 31. The grooves 32 and 33 are adapted to removably receive the deformable sealing gasket cage generally designated 34 and illustrated in Figure 7. The cage 34 is formed of rubber or a suitable substitute so as to be deformable and subject to being readily snapped into the receiving grooves 31 and 32 clearly illustrated in Figure 6. The cage generally designated 34 includes a top ring 35, a bottom ring 36 and two diametrically, oppositely placed upright legs 37.

When the valve is assembled, the deformable cage 34 is mounted on the rotor plug 30, and the parts are so dimensioned that the outer portions of the rings 35 and 36 and the legs 37 will project beyond the periphery of the plug. The plug is then inserted in the shell 26, and the internal diameter of the shell is such that this assembly will partially deform the cage 34 and cause the rings 35 and 36 and the legs 37 to tightly contact between the plug and the shell so that these elements will rotate together as a unit and yet be subject to limited relative rotational movement to the limited extent permitted by the deformability of the gasket cage 34. It will be apparent by reference to Figure 3 that the plug 30 and the sell 26 are so assembled that each side recess 31 of the plug will communicate with two of the shell openings 29.

The rotor turning stem 14 is inserted through the receiving bore 13 so that the turning flange 17 will engage at the top of the rotor bore 7, and the valve rotor comprising the assembled plug 30, the shell 26 and the yieldable connecting gasket cage 34 is mounted in the bore 7 with the shell lugs 28 engaged in the driving flange notch 18. This assembly is secured by mounting of the closure plug 11, and the assembly of the valve is completed by mounting of the indexing means 20 and 22, the collar 25 and the turning handle 23.

Each time the handle is turned to connect selected pairs of the casing ports 6, the plug 30 and the shell 26 will turn together because of the driving connection brought about by the frictional contact of the deformable gasket cage 34 therebetween, and each time the rotor is turned in one direction or the other, the engagement of the flange notch 18 with a shell driving lug 28 will slightly wind or contract the diameter of the shell and thereby reduce the turning effort required to turn the shell and the cooperating plug 30 in the rotor bore 7. It will be obvious that the slight spacing of the plug 30 within the shell 26 and the deformable nature of the gasket cage parts 35, 36 and 37 make this slight contraction of the shell possible.

In the manufacture of the valve parts, it is preferred that the shell 29 be ground to exactly the same diameter as the rotor bore 7. However, in order to provide a desired yielding action for pressing the outer surface of the shell into fluid tight engagement with the rotor bore 7, the shell, when clamped in the grinding fixture, is forcibly contracted so that the split therein is somewhat closed, and while the shell is so clamped, the outer surface thereof is accurately ground to the diameter stated. Thus, when the shell is inserted in the rotor bore 7, there is a tendency for the shell to expand, and the shell thus yieldably presses against the surrounding rotor bore. It will be obvious also that the assembly of the plug 30 and the gasket cage 34 in the manner hereinabove described serves to augment the natural resilience of the shell itself, the deformed gasket parts 35, 36 and 37 serving to additionally press the shell against the surrounding rotor bore walls.

While one form of the invention has been shown for purposes of illustration, it is to be clearly understood that various changes in the details of construction and arrangement of parts may be made without departing from the spirit and scope of the invention as defined in the appended claims.

I claim:

1. In a valve assembly, a casing having inlet and outlet ports therein and a rotor bore, a split shell snugly and rotatably engaging in the rotor bore and having flow openings therein for cooperating with the casing ports in controlling flow through the valve, means within the shell yieldably expanding the same against the rotor bore walls, and turning means so connected with the shell as to contract the same slightly as it is turned in one direction or the other, thereby to reduce the effort required to turn the shell in the rotor bore, said expanding means including a plug spaced within the shell and a deformable ring extending about the plug and deformed between and frictionally engaging the plug and the shell.

2. In a valve assembly, a casing having inlet and outlet ports therein and a rotor bore, a split shell snugly and rotatably engaging in the rotor bore and having flow openings therein for cooperating with the casing ports in controlling flow through the valve, means within the shell yieldably expanding the same against the rotor bore walls, and turning means so connected with the shell as to contract the same slightly as it is turned in one direction or the other, thereby to reduce the effort required to turn the shell in the rotor bore, said expanding means including a plug spaced within the shell and having flow passages therein for cooperating with the shell openings in controlling flow through the valve and a deformable ring extending about the plug at each end thereof and deformed between and frictionally engaging the plug and the shell.

3. In a valve assembly, a casing having four ports therein arranged in a common plane and in equidistantly spaced relation and a rotor bore, a split shell snugly and rotatably engaging in the rotor bore and having four openings therein placed for selective simultaneous registry with the casing ports, a plug spaced within the shell and having a recess in each side thereof communicating with two shell openings and placeable by turning of the shell and plug in unison for selectively connecting two of the casing ports, a deformable sealing gasket cage comprising upper and lower rings extending about the plug above and below the shell openings and plug recesses and two vertical legs connecting the rings between the plug recesses, said gasket cage being deformed between and frictionally engaging the plug and shell to cause them to move together and to yieldably expand the shell against the rotor bore walls, and means for turning the rotor and shell so constructed and arranged in cooperative engagement with the shell as to contract the same slightly as it is turned in one direction or the other, thereby to reduce the effort required to turn the shell in the rotor bore.

JOSEPH F. MELICHAR.